United States Patent
Reilley

[19]
[11] Patent Number: 6,137,579
[45] Date of Patent: Oct. 24, 2000

[54] PLANAR ALIGNMENT SYSTEM AND METHOD

[76] Inventor: Peter Reilley, 20 King Arthur Dr., Londonderry, N.H. 03053

[21] Appl. No.: 09/378,778

[22] Filed: Aug. 20, 1999

[51] Int. Cl.[7] .................................................. G01B 11/00
[52] U.S. Cl. ........................................... 356/399; 356/400
[58] Field of Search .................................... 356/399–401, 356/363, 141, 138; 33/286, 235, 227, 228

[56] References Cited

U.S. PATENT DOCUMENTS

| | | | |
|---|---|---|---|
| 4,022,533 | 5/1977 | Firester | 356/153 |
| 4,566,202 | 1/1986 | Hamar | 33/286 |
| 5,532,815 | 7/1996 | Kipman et al. | 356/139.03 |
| 5,552,883 | 9/1996 | Busch-Vishniac et al. | 356/139.03 |
| 5,661,667 | 8/1997 | Rueb et al. | 364/525 |
| 6,031,616 | 2/2000 | Seiffert | 356/399 |

*Primary Examiner*—Frank G. Font
*Assistant Examiner*—Michael P. Stafira
*Attorney, Agent, or Firm*—Kirk Teska; Iandiorio & Teska

[57] ABSTRACT

A planar alignment system and method for aligning a first planar surface parallel to a second planar surface including: attaching a target base having a first planar reflective surface so that the first planar reflective surface is parallel to the first planar surface, positioning a reflector having a second planar reflective surface so that the second planar reflective surface is parallel to the second planar surface, positioning a planar target parallel to one of the planar surfaces, transmitting a radiation beam, at an angle perpendicular to one of the planar surfaces, from a radiation transmitter releasably attached to that planar surface, toward the planar reflective surface of the other planar surface, and reflecting the transmitted radiation beam between the planar reflective surfaces so that the reflected radiation beam strikes the planar target, producing a calibration point whose displacement from the originally transmitted radiation beam is indicative of the positional alignment between the first planar surface and the second planar surface.

21 Claims, 2 Drawing Sheets

PLANAR ALIGNMENT SYSTEM AND METHOD

FIELD OF INVENTION

This invention relates to a planar alignment system and method for aligning a first planar surface to a second planar surface and more particularly to such a system and method which aligns a machine head to a milling table.

BACKGROUND OF INVENTION

Milling machines, and metal working machines in general, require precision tolerances to produce a quality work product. Machines such as Bridgeport milling machines have a machine head which holds a cutting head in a quill for use it machining metal which is attached to a milling table. The milling table of the Bridgeport milling machine is moveable, via a plurality of hand screws, so that the object being machined can be moved in relation to the cutting head. Additionally, this machine head is rotatable about one or two axes so that, for example, a flat bottomed cutting head can be used to machine a V groove in a piece of metal by rotating the machine head to an angle of 45°.

This ability to rotate the machine head in relation to the milling table, while convenient, causes several problems when the machine head must be realigned to its normal (or perpendicular) position in relation to the milling table. Since a milling machine is used to do high precision milling processes, it is imperative that this machine head and quill assembly be properly aligned with the milling table. There are currently several ways of aligning this machine head to the milling table, all of which are very cumbersome and/or require the use of expensive components.

Traditionally, a machine head is aligned to a milling table through the use of a precision bracket assembly and a dial indicator. The quill assembly of a milling machine is similar to that of a chuck on a drill press, where a bit is inserted into the quill assembly and it rotates about a predefined axis. A typical way of aligning a machine head/quill assembly to a milling table is to insert into the quill assembly an offset bracket which positions a dial indicator a predetermined distance away from the axis upon which the quill assembly turns. This offset is typically five (5) inches. In order to calibrate the milling table, the bracket is spun to a first position on the milling table (e.g. 90°) and a reading is taken on the dial indicator. Then, the quill assembly (and the bracket) are rotated through a 180° arc so that a second reading can be taken at a second position on the milling table (e.g. 270°). Assuming that the milling table is in perfect alignment with the quill assembly along this first axis (the X axis), the readings on the dial indicator should be the same. In the event that there is any variation between the reading taken at 90° and the reading taken at 270°, the machine head is out of alignment and must be aligned in relation to the X axis. This calibration procedure is repeated until the dial indicators read the same at the 90° and 270° intervals. Once this is completed, this calibration procedure is repeated for the Y axis, where readings are taken at 0° and 180° intervals.

Again, as with X axis calibration, the calibration procedures are repeated for the Y axis until the readings on the dial indicator are the same. At this point, the user must recheck the alignment along the X axis to verify that aligning the Y axis did not compromise the alignment of the X axis. Once this is done, the machine head is aligned in relation to the milling table and the milling process can begin. As can be imagined, this is a long and complicated process which can take a considerable amount of time to complete.

Alternatives to this procedure include a device which is essentially a large bell shaped object which is inserted into the quill assembly. This is a precision machined device which improves upon the idea of the rotatable dial indicator in that it measures in multiple axes simultaneously. To use this device, it is inserted into the quill assembly and then the user inserts feeler gauges between the lower surface of the bell and the milling table to determine the clearance between the bell and the table. If the quill is aligned in both axes (X and Y), the clearance measurements taken with the feeler gauges at points 0°, 90°, 180° and 270° would all be the same. While this simplifies the procedure of aligning the quill assembly with the milling table, this precision machined bell assembly is very large and requires essentially the use of the entire milling table to align the machine head. Additionally, this device is costly and requires considerable space to store.

Further, either of the two previously described devices can be utilized in conjunction with a sine plate. The use of a sine plate enables the above-mentioned devices to be used to position the milling head in non-perpendicular orientation in relation to the milling table. During use, a plurality of precision machined blocks are placed under one side of the sine plate so that the angle of the surface of the sine plate, in relation to the milling table, is the desired cutting angle. By varying the number of blocks utilized with the sine plate, the angle between the milling head and the milling table can be varied, allowing the milling head to be precisely positioned in relation to the milling table.

SUMMARY OF INVENTION

It is therefore an object of this invention to provide a planar alignment system and method which improves accuracy while reducing cost.

It is a further object of this invention to provide such a system and method which allows for multi-axis machine head alignment.

It is a further object of this invention to provide such a system and method which employs components that are small in size, easily stored, and do not require the use of the entire milling table during alignment.

It is a further object of this invention to provide such a system and method which is self-calibrating.

This invention results from the realization that a truly effective planar alignment system and method for aligning a first planar surface parallel to a second planar surface can be achieved by positioning a reflector parallel to the second planar surface, transmitting a radiation beam perpendicular to the first planar surface toward the reflector so that the beam will be reflected between the two surfaces to produce a calibration point on a planar target whose displacement from the target center is indicative of the positional alignment between the first and second planar surfaces.

This invention features a planar alignment system for aligning a first planar surface parallel to a second planar surface including: a target base, releasably attachable to the first planar surface, said target base having a first planar reflective surface positioned parallel to the first planar surface; a reflector, releasably attachable to the second planar surface, the reflector having a second planar reflective surface positioned parallel to the second planar surface; a radiation transmitter, releasably attachable to one of the planar surfaces, for transmitting a radiation beam, perpendicular to the planar surface to which it is attached, toward the planar reflective surface of the other planar surface; and a planar target, positioned parallel to one of the planar surfaces and radially disposed about the transmitted radiation beam, where the radiation beam is reflected between the planar reflective surfaces and strikes the planar targets producing a calibration point whose displacement from the originally transmitted radiation beam is indicative of the positional alignment between the first planar surface and the second planar surface.

The planar target may include a diffusing medium to produce the calibration point. The reflector may include a runout device for adjusting the position of the second planar reflective surface relative to the second planar surface. The target base may include a targeting device for adjusting the position of the first planar reflective surface relative to the first planar surface. The radiation transmitter may include an aiming device for adjusting the position of the radiation beam relative to the planar surface to which it is attached. The diffusing medium may be an etched surface of a piece of glass. The diffusing medium may be a partially transparent medium. The planar target may include a calibration device for use with the calibration point for indicating the degree of misalignment between the first planar surface and the second planar surface. The calibration device may he a plurality of concentric rings etched on the diffusing medium and positioned about the radiation beam, each of the plurality concentric rings corresponding to a specific degree of misalignment between the first planar surface and the second planar surface, where the reflected radiation beam strikes the planar target, forming the calibration point on one of the plurality of concentric rings, whereby the degree of misalignment between the first planar surface and the second planar surface is indicated. The reflector may include a rearward facing extrusion which is perpendicular to the second planar reflective surface. The extrusion may be positioned within the quill of a machine head. The extrusion may be positioned in an accessory port in a machine head. The planar target may be attached to She first planar reflective surface. The planar target may be attached to the second planar reflective surface. The planar target may be positioned between the first and second planar reflective surfaces.

This invention also features a planar alignment system for aligning a first planar surface parallel to a second planar surface including: a target base, releasably attachable to the first planar surface, the target base having a first planar reflective surface positioned parallel to the first planar surface; a reflector, releasably attachable to a second planar surface, the reflector having a second planar reflective surface positioned parallel to the second planar surface; a radiation transmitter, releasably attachable to one of the planar surfaces, for transmitting a radiation beam, perpendicular to the planar surface to which it is attached, toward the planar reflective surface of the other planar surface; and a planar target, positioned parallel to one of the planar surfaces and radially disposed about he transmitted radiation beam, where the radiation beam is reflected between the planar reflective surfaces and strikes the planar target, the planar reflective target including a diffusing medium, producing a calibration point visible on the diffusing medium indicative o the positional alignment between the first planar surface and the second planar surface.

In a preferred embodiment, the diffusing medium may be an etched surface of a piece of glass. The diffusing medium may be a partially transparent medium. The planar target may include a calibration device for use with the calibration point for indicating the degree of misalignment between the first planar surface and the second plane surface. The calibration device may be a plurality of concentric rings etched on the diffusing medium and positioned about the radiation beam, each of the plurality of concentric rings corresponding to a specific degree of misalignment between the first planar surface and the second planar surface, where the reflected radiation beam strikes the planar target, forming the calibration point on one of the plurality of concentric rings, whereby the degree of misalignment between the first planar surface and the second planar surface is indicated.

This invention also features a method of aligning a first planar surface parallel to a second planar surface comprising the steps of: attaching a target base having a first planar reflective surface so that the first planar reflective surface is parallel to the first planar surface; positioning a reflector having a second planar reflective surface so that the second planar reflective surface is parallel to the second planar surface; positioning a planar target parallel to one of the planar surfaces; transmitting a radiation beam, at an angle perpendicular to one of the planar surfaces, from a radiation transmitter releasably attached to that planar surface, toward the planar reflective surface of the other planar surface; and reflecting the transmitted radiation beam between the planar reflective surfaces so that the reflected radiation beam strikes the planar target, producing a calibration point whose displacement from the originally transmitted radiation beam is indicative of the positional alignment between the first planar surface and the second planar surface.

DISCLOSURE OF PREFERRED EMBODIMENT

Other objects, features and advantages will occur to those skilled in the art from the following description of a preferred embodiment and the accompanying drawings, in which.

Figure 1:
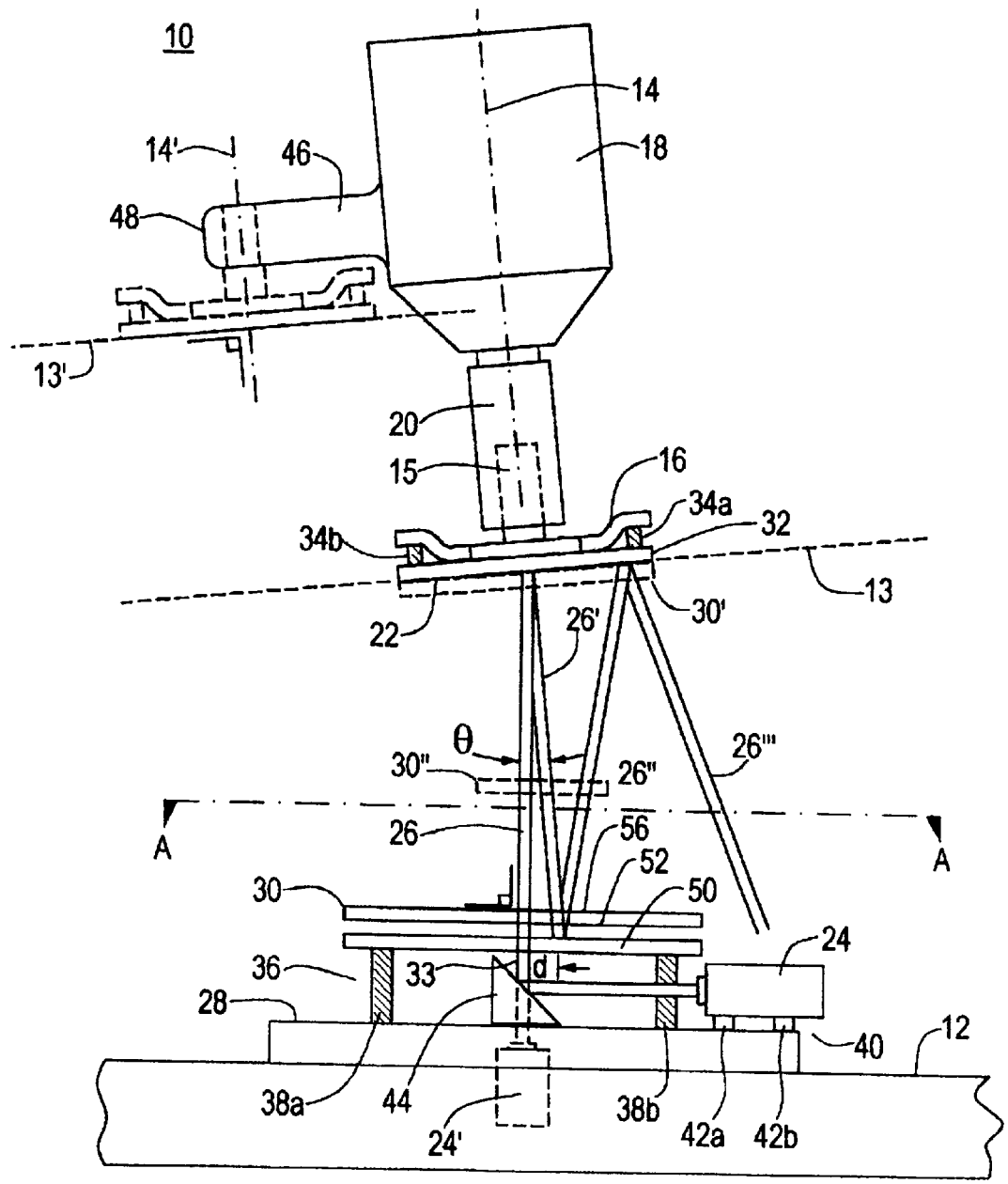
FIG. 1 is a plan view of the planar alignment system of this invention.

In accordance with this invention, the planar alignment system 10, FIG. 1, for aligning a first planar surface 12 parallel to a second planar surface 13 includes a reflector 16 which is releasably attached to a machine head 18 having a quill 20 whose radial center is axis 14. Axis 14 is perpendicular to second planar surface 13. Reflector 16 has a second planar reflective surface 22 which is positioned parallel to second planar surface 13 and, therefore, perpendicular to axis 14. A rearward extrusion 15 is attached to reflector 16 and positions second planar reflective surface 22 perpendicular to axis 14. Since, in this embodiment, reflector 16 is chucked in quill 20, rotating quill 20 about axis 14 will have no effect on the perpendicularity of reflector 16. A target base 28, releasably attachable to first planar surface 12, has a first planar reflective surface 50 positioned parallel to the first planar surface 12.

A radiation transmitter 24, which is releasably attachable to one of the planar surfaces 12 or 13, transmits a radiation beam 26, perpendicular to the planar surface to which it is attached, toward the planar reflective surface 22 or 50 of the other planar surface 13 or 12. Planar target 30 is positioned parallel to one of the planar surfaces 12 or 13 and radially disposed about radiation beam 26. While, in this particular example, target 30 is positioned adjacent first planar reflective surface 50 and, therefore, coplanar with first planar surface 12, this is for illustrative purposes only and is not intended to be a limitation of this invention. For example, target 30' can be positioned adjacent second planar reflective surface 22 or target 30" can be centrally located between reflective surfaces 22 and 50.

Specifically, radiation beam 26 passes through the center 33 of planar target 30. Radiation beam 26 is reflected from second planer reflective surface 22 and reflected radiation beam 26' strikes planar target 30, thus indicating the positional alignment between first planar surface 12 and second planar surface 13.

While, in the attached drawings, the planar alignment system 10 is shown in use on a milling machine, this is for illustrative purpose only, as this system can be used to align any pair of planar surfaces or any axis to any planar surface. Additionally, while radiation beam 26 is shown passing through the center 32 of planar target 30, this is for illustration purpose only and is not intended to be a limitation of the invention.

In the event that axis 14 of machine head 18 is positioned perpendicular to first planar surface 12 (indicating that planar surfaces 12 and 13 are parallel), reflected radiation beam 26', after striking second planar reflective surface 22, will be reflected back down upon itself repeatedly until the radiation beam is fully attenuated. However, in the event that axis 14 of machine head 18 is not exactly perpendicular to first planar surface 12, reflected beam 26' will not be reflected upon itself and attenuated. Reflected beam 26' will strike first planar reflective surface 50 and be reflected back towards second planar reflective surface 22. Depending on the degree of misalignment between axis 14 and first planar surface 12, twice-reflected beam 26" may once again strike second planar reflective surface 22 and be reflected back towards first planar reflective surface 50. This reflecting process will continue numerous times until the radiation beam is reflected off of either one of the reflective surfaces 22 or 50.

Reflector 16 includes a runout device 32 for adjusting the position of second planar reflective surface 22 relative to axis 14. Specifically, runout device 32 allows the user to compensate for any misalignment in the perpendicular relationship between second planar reflective surface 22 and axis 14. Runout device 32 may include four set screws 34a and 34b (only two of the four shown) positioned at 90 degree intervals so that either pair of set screws allows for compensation of runout in one axis.

Target base 28 includes a targeting device 36 for adjusting the position of first planar reflective surface 50 relative to first planar surface 12. As with runout device 32, targeting device 36 allows the user to fine tune the position of first planar reflective surface 50, relative to first planar surface 12, to ensure that these two surfaces are parallel to each other. Typically, targeting device 36 would include four set screws 38a and 38b (only two of the four shown) positioned at 90 degree intervals to each other so that any pair of set screws will adjust the planar relationship in a single axis.

Radiation transmitter 24 includes an aiming device 40 for adjusting the postion of radiation beam 26 relative to the planar surface to which it is attached 12 or 13. Aiming device 40 is used to ensure that radiation beam 26 is transmitted perpendicular to that planar surface 12 or 13. Typically, aiming device 40 would include four set screws 42a and 42b (only two of the four shown) for aiming radiation beam 26.

While radiation transmitter 24 is depicted as transmitting a beam parallel to first planar surface 12, where reflector 44 is utilized to reflect radiation beam 26 so that it is perpendicular to surface 12, this is for illustrative purposes only. Alternatively a vertical radiation transmitter 24' (shown here in phantom) can be used to directly transmit radiation beam 26 perpendicular to first planar surface 12. In the event that vertical radiation transmitter 24' in utilized, reflector 44 is not required. Additionally, radiation transmitter 26 could be releasably attached to second planar surface 13 and transmit beam 26 toward first planar surface 12.

While, thus far, reflector 16 has been shown as being positioned within quill 20, this is not necessarily a limitation of this invention. Milling machines typically have an accessory flange 46 on milling head 14 which has a bore 48 having an axis 14' parallel to axis 14 of quill 20. Further, planar surface 13' is parallel to second planar surface 13. Therefore, reflector 16 can be positioned within bore 48 of accessory flange 46. In the event that accessory flange 46 is utilized, target base 28, which typically has radiation transmitter 24 and planar target 30 attached to it, would be moved into position under accessory flange 46 so that radiation beam 26 would strike second planar reflective surface 22 of reflector 16.

Planar target 30 includes a diffusing medium 52. When reflected radiation beam 26' passes through planar target 30 and strikes first planar reflective surface 50, beam 26' is reflected back up towards reflector 16 while diffusing medium 52 (of target 30) diffuses a portion of beam 26' so that a calibration point 56 is visible on diffusing medium 52. This diffusing medium 52 can be created in several different ways. For example, the planar target 30 could be a piece of glass and the diffusing medium 52 could be created by lightly etching the surface of the glass. Therefore, the surface etching 52 of planar target 30 would partially diffuse reflected radiation beam 26' (creating calibration point 56). Alternatively, diffusing medium 52 could be a partially-transparent medium which passes a percentage of beam 26' to first planar reflective surface 50.

Figure 2:
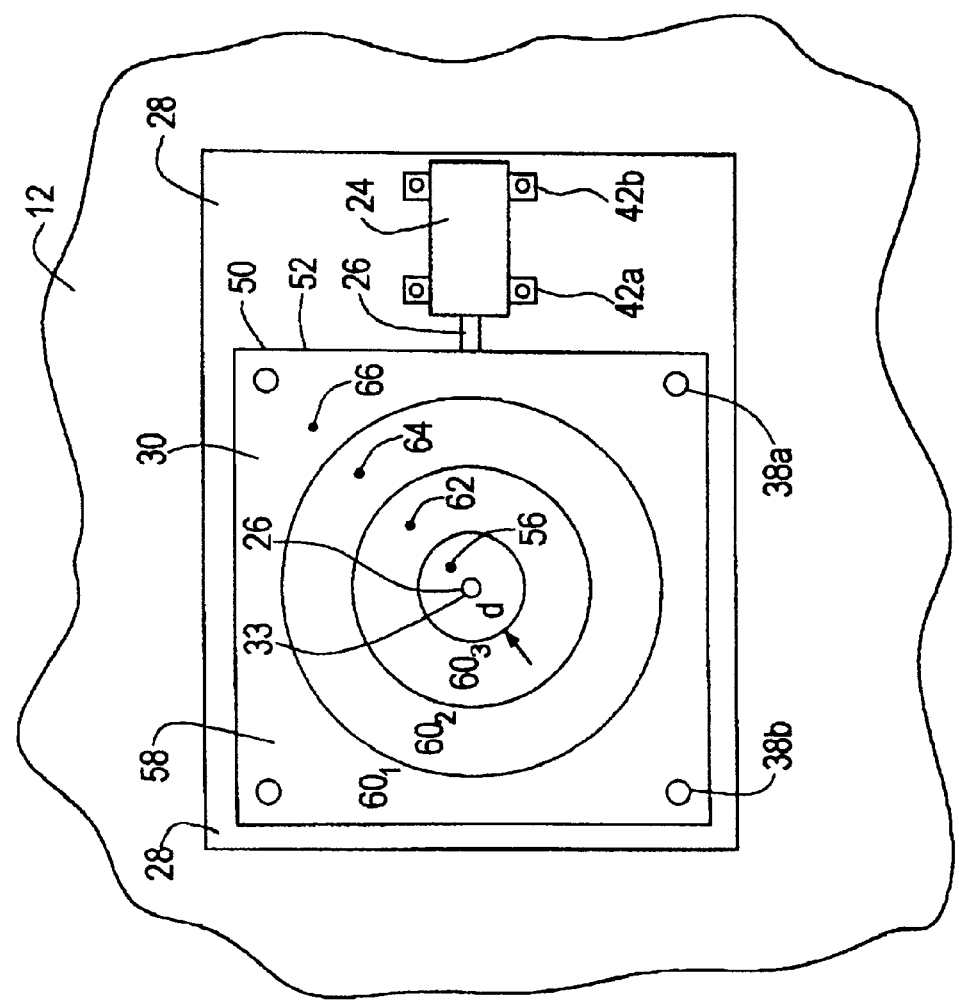
FIG. 2 is a cross-sectional view along line A—A of FIG. 1 showing a portion of the planar alignment system of this invention.

During use of the planar alignment system 10, reflected radiation beam 26' strikes planar target 30, FIG. 2, and creates a calibration point 56 visible on diffusing medium 52. Planar target 30 includes a calibration device 58 which, in conjunction with calibration point 56, indicates the degree of misalignment between the first planar surface and the axis and, therefore, the first and second planar surfaces. Calibration device 58 includes a plurality of concentric rings $60_{1-3}$ which are printed on diffusing medium 52 of planar target 30. Concentric rings $60_{1-3}$ are positioned radially about the center 33 of planar target 30 through which radiation beam 26 is transmitted. Each of the concentric rings $60_{1-3}$ corresponds to a specific amount of misalignment between the planar surface and the axis. Specifically, each concentric ring $60_{1-3}$ corresponds to a specific radial distance (d) which, when divided by the distance between the planar reflective surface and planar reflective target 30, yields the sine function of the angle of alignment between the axis of the reflector and first planar surface 12. While, in this particular example, only three (3) concentric rings are shown, this is for illustrative purposes only, as the number of rings can be varied to adjust the level of alignment resolution.

During use of the planar alignment system, radiation beam 26 is transmitted through planar target 30 and strikes the second planar reflective surface of the reflector. This creates the reflected radiation beam which strikes planar target 30 and generates calibration point 56 on diffusing medium 52. In the event that the axis of the machine head being aligned is truly perpendicular to the first planar surface 12 upon which target base 28 rests, the reflected radiation beam will also be truly perpendicular to the first planar surface and will be reflected down upon itself and attenuated. Therefore, calibration point 56 would appear as a single dot in the center 33 of planar target 30. However, in the event that the axis of the machine head is misaligned with the first planar surface 12 and, therefore, not truly perpendicular to first planar surface 12, calibration point 56 will appear somewhere off center on calibration device 58. Specifically, as the degree of misalignment increases, the distance (d) between target center 32 and calibration point 56 also increases.

Further, as the degree of misalignment between axis 14, FIG. 1 and first planar surface 12 is reduced towards zero, the angle of reflection (θ) between radiation beam 26 and reflected radiation beam 26' decreases. Therefore, the distance (d) between calibration point 56 and target center 33 is reduced. Additionally, since reflected radiation beam 26' is reflected off of first planar reflective surface 50 (creating twice-reflected beam 26"), depending on the angle of reflection, beam 26" can once again strike second planar reflective surface 22. As axis 14 is aligned further toward being truly perpendicular with first planar surface 12, thrice-reflected beam 26''', reflected from second planar reflective surface 22, will again strike planar target 30, creating a second calibration point 62, FIG. 2. As the axis is further aligned to be perpendicular with first planar surface 12, a string of calibration points (depicted here as calibration points 56, 62, 64 and 66) will appear on calibration device 58. However, it is important to note that as the axis of the machine head is further fine tuned to be truly perpendicular with first planar surface 12, all calibration points will move towards target center 33. When the axis of the machine head is perfectly perpendicular to first planar surface 12, only a single calibration point will be visible, as radiation beam 26 will be repeatedly reflected between the first and second planar reflective surfaces until the intensity of the radiation beam is attenuated to zero by the diffusing medium.

Figure 3:
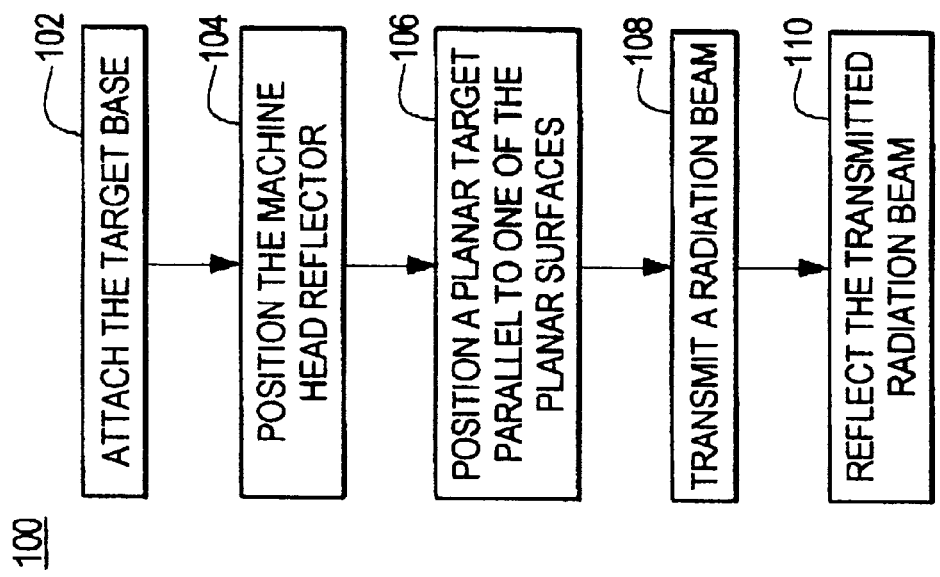
FIG. 3 is a flow chart of the planar alignment method of this invention.

Another embodiment of the planar alignment scanning method 100, FIG. 3, of this invention includes a method of aligning a first planar surface parallel to a second planar surface comprising the steps of: attaching 102 a target base having a first planar reflective surface so that the first planar reflective surface is parallel to the first planar surface; positioning 104 a reflector having a second planar reflective surface so that the second planar reflective surface is parallel to the second planar surface; positioning 106 a planar target parallel to one of the planar surfaces; transmitting 108 a radiation beam, at an angle perpendicular to one of the planar surfaces, from a radiation transmitter releasably attached to that planar surface, toward the planar reflective surface of the other planar surface; and reflecting 110 the transmitted radiation beam between the planar reflective surfaces, so that the reflected radiation beam strikes the planar target, whereby the positional alignment between the first planar surface and the second planar surface is defined.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A planar alignment system for aligning a first planar surface parallel to a second planar surface comprising:

a target base, releasably attachable to the first planar surface, said target base having a first planar reflective surface positioned parallel to the first planar surface;

a reflector, releasably attachable to the second planar surface, said reflector having a second planar reflective surface positioned parallel to the second planar surface;

a radiation transmitter, releasably attachable to one of the planar surfaces, for transmitting a radiation beam, perpendicular to the planar surface to which it is attached, toward the planar reflective surface of the other planar surface; and a planar target, positioned parallel to one of the planar surfaces and radially disposed about said transmitted radiation beam, wherein said radiation beam is reflected between said planar reflective surfaces and strikes said planar target, producing a calibration point whose displacement from said originally transmitted radiation beam is indicative of the positional alignment between the first planar surface and the second planar surface.

2. The planar alignment system of claim 1 in which said planar target includes a diffusing medium to produce said calibration point.

3. The planar alignment system of claim 1 in which said reflector includes a runout device for adjusting the position of said second planar reflective surface relative to the second planar surface.

4. The planar alignment system of claim 1 in which said target base includes a targeting device for adjusting the position of said first planar reflective surface relative to the first planar surface.

5. The planar alignment system of claim 1 in which said radiation transmitter includes an aiming device for adjusting the position of said radiation beam relative to the planar surface to which it is attached.

6. The planar alignment system of claim 2 in which said diffusing medium is an etched surface of a piece of glass.

7. The planar alignment system of claim 2 in which said diffusing medium is a partially transparent medium.

8. The planar alignment system of claim 2 in which said planar target includes a calibration device for use with said calibration point for indicating the degree of misalignment between the first planar surface and the second planar surface.

9. The planar alignment system of claim 8 in which said calibration device is a plurality of concentric rings etched on said diffusing medium and positioned about said radiation beam, each of said plurality of concentric rings corresponding to a specific degree of misalignment between the first planar surface and the second planar surface, wherein said reflected radiation beam strikes said planar target, forming said calibration point on one of said plurality of concentric rings, whereby the degree of misalignment between the first planar surface and the second planar surface is indicated.

10. The planar alignment system of claim 1 in which said reflector includes a rearward facing extrusion which is perpendicular to said second planar reflective surface.

11. The planar alignment system of claim 10 in which said extrusion is positioned within a quill of a machine head.

12. The planar alignment system of claim 10 in which said extrusion is positioned in an accessory port of a machine head.

13. The planar alignment system of claim 1 in which said planar target is positioned proximate said first planar reflective surface.

14. The planar alignment system of claim 1 in which said planar target is positioned proximate said second planar reflective surface.

15. The planar alignment system of claim 1 in which said planar target is positioned between said first and second planar reflective surfaces.

16. A planar alignment system for aligning a first planar surface parallel to a second planar surface comprising:

a target base, releasably attachable to the first planar surface, said target base having a first planar reflective surface positioned parallel to the first planar surface;

a reflector, releasably attachable to the second planar surface, said reflector having a second planar reflective surface positioned parallel to the second planar surface;

a radiation transmitter, releasably attachable to one of the planar surfaces, for transmitting a radiation beam, perpendicular to the planar surface to which it is attached, toward the planar reflective surface of the other planar surface; and a planar target, positioned parallel to one of the planar surfaces and radially disposed about said transmitted radiation beam, wherein said radiation beam is reflected between said planar reflective surfaces and strikes said planar target, said planar target including a diffusing medium, producing a calibration point visible on said diffusing medium indicative of the positional alignment between the first planar surface and the second planar surface.

17. The planar alignment system of claim 16 in which said diffusing medium is an etched surface of a piece of glass.

18. The planar alignment system of claim 16 in which said diffusing medium is a partially transparent medium.

19. The planar alignment system of claim 16 in which said planar target includes a calibration device for use with said calibration point for indicating the degree of misalignment between the first planar surface and the second planar surface.

20. The planar alignment system of claim 19 in which said calibration device is a plurality of concentric rings etched on said diffusing medium and positioned about said radiation beam, each of said plurality of concentric rings corresponding to a specific degree of misalignment between the first planar surface and the second planar surface, said reflected radiation beam strikes said planar target, forming said calibration point on one of said plurality of concentric rings, whereby the degree of misalignment between the first planar surface and the second planar surface is indicated.

21. A method of aligning a first planar surface parallel to a second planar surface comprising the steps of:

attaching a target base having a first planar reflective surface so that said first planar reflective surface is parallel to the first planar surface;

positioning a reflector having a second planar reflective surface so that said second planar reflective surface is parallel to the second planar surface;

positioning a planar target parallel to the second planar surface;

transmitting a radiation beam, at an angle perpendicular to one of the planar surfaces, from a radiation transmitter releasably attached to that planar surface, toward the planar reflective surface of the other planar surface; and reflecting said transmitted radiation beam between said planar reflective surfaces, so that said reflected radiation beam strikes said planar target, producing a calibration point whose displacement from said originally transmitted radiation beam is indicative of the positional alignment between the first planar surface and the second planar surface.

\* \* \* \* \*